Nov. 27, 1923.
A. O. JUDSON
SPRING BUSHING
Filed Oct. 5, 1921
1,475,344
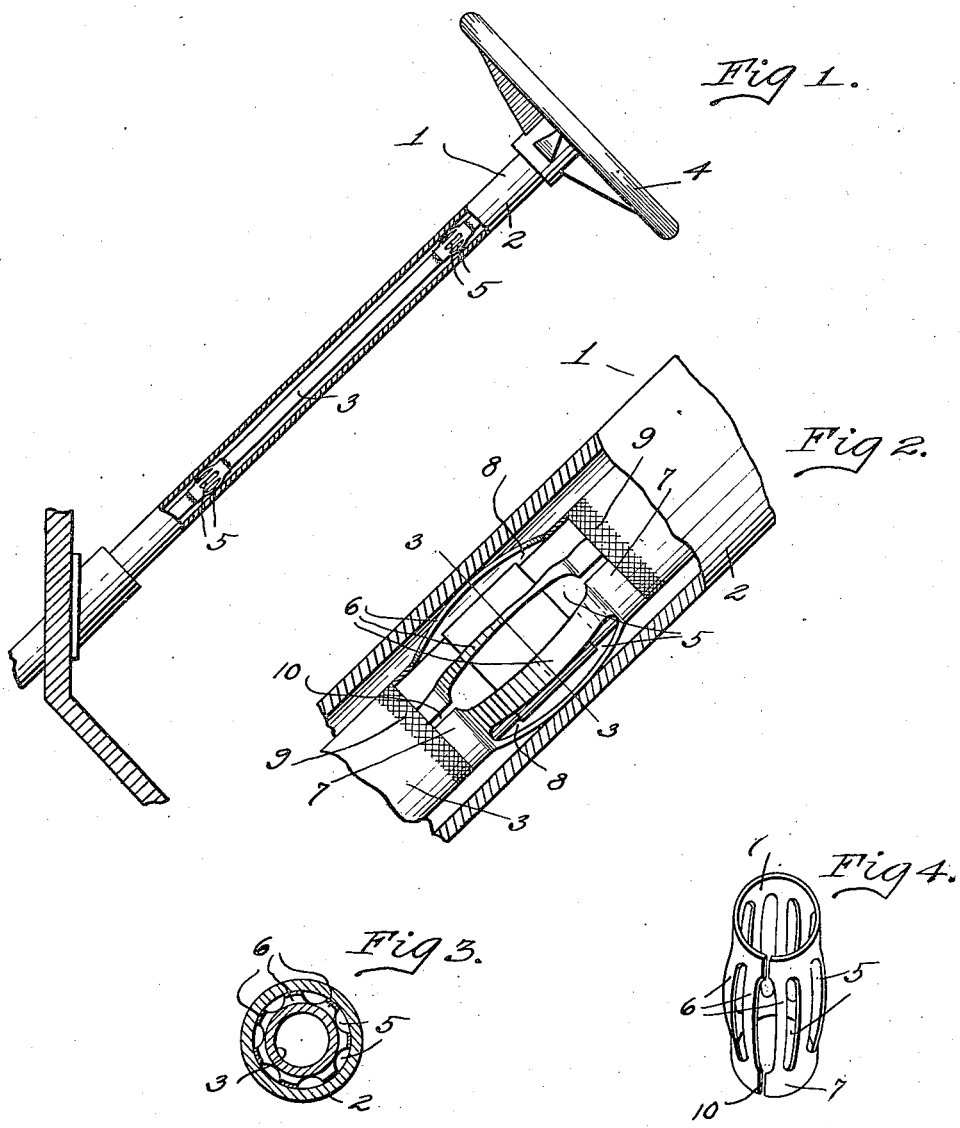
Inventor
Albert O. Judson
By C. C. Shepherd
Attorney Patented Nov. 27, 1923.

1,475,344

UNITED STATES PATENT OFFICE.

ALBERT O. JUDSON, OF COLUMBUS, OHIO.

SPRING BUSHING.

Application filed October 5, 1921. Serial No. 505,612.

*To all whom it may concern:*

Be it known that ALBERT O. JUDSON, a citizen of the United States, residing at Columbus, in the county of Franklin and State of Ohio, has invented certain new and useful Improvements in Spring Bushings, of which the following is a specification.

This invention relates to an improved spring bushing adapted to be situated between concentrically disposed inner and outer members for the purpose of maintaining the said members in properly spaced relationship so as to preclude the engagement of said members and also the resulting rattling noises set up by such engagement.

Another object of the invention resides in the provision of an improved spring bushing adapted to be positioned between the inner and outer telescoping and concentrically arranged members of the steering column construction of a motor vehicle, the said bushing being of substantially tubular formation and positioned upon the inner member, the said bushing being formed to include a plurality of resilient fingers disposed for engagement with the outer member, said fingers serving to resiliently space the said members to eliminate physical contact therebetween and thus eliminating the rattle and vibration which is ordinarily permitted to obtain particularly in steering columns.

A further object of the invention rests in an anti-rattling device of the above stated character which is formed from a blank of sheet metal and bent into substantially tubular formation, wherein the blank in its process of formation, is stamped to produce a plurality of outwardly bowed resilient fingers, formed integrally with the bushing, the said fingers serving to render the bushing yieldable to compressive diametrically disposed forces so that the bushing may be employed in the capacity of a cushioning member. A still further object rests in forming the inner member of the steering column upon which the bushing is positioned with means serving to preclude longitudinal movement on the part of said bushing with respect to said member, thus positively positioning the said bushing so as to insure its retention in an applied or operative position.

For a further understanding of the invention, reference is to be had to the following description and to the accompanying drawing, in which:

Figure 1 is a view in side elevation of the steering column of a motor vehicle, portions thereof being disclosed in section to illustrate the operative positions of the spring bushings comprising the present invention, Figure 2 is a similar view on an enlarged scale disclosing more clearly the construction of the bushing.

Figure 3 is a transverse sectional view taken on the plane indicated by the line 3—3 of Figure 2, and Figure 4 is a perspective view of the bushing detached from the steering column.

Referring more particularly to the accompanying drawing, the numeral 1 designates generally the steering column of a motor vehicle, which has been selected for illustrative purposes only. This column, as usual, consists of an outer stationary or rotatable casing 2, which will be hereinafter referred to as the outer member, and within this member there is positioned the telescoping and concentrically disposed inner member or shaft 3, the latter having its upper end connected with the steering wheel 4, whereby the member 3 may be rotated to govern the operations and positions of an associated steering wheel mechanism, not shown.

It has been found that in operation the relatively movable inner and outer members are likely to become loosened in their bearings so that undue vibration therebetween is set up, causing a rattling noise to be produced, which is difficult to locate and overcome. Therefore, the present invention provides a resilient bushing arranged between the said members so that the inner member particularly will be maintained in proper alignment and prevented from vibrating unduly. My improved spring bushing is formed preferably from a blank of sheet metal having a plurality of longitudinally extending slots 5 formed therein by suitable die or stamping operations, the said slots serving to define therebetween a plurality of ribs or fingers 6. Following the formation of the slots and the proper shaping of the bushing blank, the latter is rolled into substantially tubular form, and during the same rolling operation the ribs 6 are outwardly bowed, as indicated, in order that the greatest diameter through the bushing will be situated at the intermediate portions of the ribs 6, the said ribs terminating at each end in collars 7 which possess a diameter less than that of the intermediate portions of the ribs.

In use, the inner member 3 is preferably grooved as indicated at 8 to provide spaced shoulders and between these shoulders of the inner member, the bushings are forced and positioned in order that by reason of their inherent resiliency the same will be caused to grip and embrace the inner member with a sufficient degree of firmness to preclude longitudinal slipping movement on the part of said bushings. This construction, therefore, results in securely retaining the bushings in their applied positions. It will be observed that when forced into their applied positions between the inner and outer members of the steering column the ribs will be forced into frictional engagement with the inner wall of the member 2, causing said ribs to be compressed and to thus place the same under tension. This tension is utilized to maintain said members in properly spaced relationship and to eliminate the vibration and rattle so commonly prevalent therebetween. The ribs 6 are longitudinally bowed so that the forcing of the same between the members 2 and 3 may be effected with proper convenience and will adjust themselves to any unevenness which may be present on the interior wall of the outer member.

In view of the foregoing it will be seen that the present invention provides a simple and effective construction for overcoming rattle and vibration between the inner and outer members of the steering post of a motor vehicle and that this result is capable of being accomplished in a convenient, simple and inexpensive manner. If desired, and as shown in Figure 2, the inner member 3 of the steering post may be provided above and below the groove 8 into which the bushing, comprising the present invention, is adapted to be situated with scored surfaces 9. The provision of these roughened surfaces will serve as additional means of eliminating undue longitudinal movement on the part of the bushing and thus assuring its retention in its operative position. By providing the bushing with a longitudinally extending slit 10, the application of the bushing to the inner member may be easily effected by springing the separable edges of the bushing. When these edges are released the bushing, by reason of its resiliency, will be restored to its normal tubular form capable of gripping and exercising frictional pressure upon the inner member of the column.

What is claimed is:

A steering column comprising an outer tubular member and a shaft considerably smaller in diameter than the tubular member and disposed therein, said shaft being circumferentially grooved to form upper and lower shoulders, in combination with a resilient bushing comprising upper and lower split collars which snugly embrace the shaft adjacent said shoulders and the ends of which abut said shoulders and a plurality of outwardly bowed and longitudinally extending ribs connecting said collars, said collars and said ribs being formed of a single and integral part, said shaft turning in said split collars and said bushing being held against turning by the engagement of its longitudinally extending ribs with the inner wall of the tubular member.

In testimony whereof I affix my signature.

ALBERT O. JUDSON.